United States Patent
Mendes et al.

(10) Patent No.: US 6,908,687 B2
(45) Date of Patent: Jun. 21, 2005

(54) HEAT-SHRINKABLE POLYMERIC FILMS

(75) Inventors: Lindsay J. Mendes, Rochester, NY (US); Benoit Ambroise, Montmedy (FR); Pang-Chia Lu, Pittsford, NY (US); David Randall Williams, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 10/331,250

(22) Filed: Dec. 30, 2002

(65) Prior Publication Data

US 2004/0126518 A1 Jul. 1, 2004

(51) Int. Cl.[7] ............................................. B32B 27/32
(52) U.S. Cl. ..................... 428/516; 428/334; 428/910; 525/240
(58) Field of Search .......................... 525/240; 428/516, 428/910, 334.9

(56) References Cited

U.S. PATENT DOCUMENTS

| | | |
|---|---|---|
| 3,808,304 A | 4/1974 | Schirmer |
| 4,188,350 A | 2/1980 | Vicik et al. |
| 4,194,039 A | 3/1980 | Mueller |
| 4,377,616 A | 3/1983 | Ashcraft et al. |
| 4,390,385 A | 6/1983 | Ferguson et al. |
| 4,448,792 A | 5/1984 | Schirmer |
| 4,582,752 A | 4/1986 | Duncan |
| 4,853,602 A | 8/1989 | Hommes et al. |
| 4,921,749 A | 5/1990 | Bossaert et al. |
| 4,950,720 A | 8/1990 | Randall, Jr. et al. |
| 4,963,418 A | 10/1990 | Isaka et al. |
| 5,272,016 A | 12/1993 | Ralph |
| 5,279,872 A | 1/1994 | Ralph |
| 5,302,402 A | 4/1994 | Dudenhoeffer et al. |
| 5,376,394 A | 12/1994 | Dudenhoeffer et al. |
| 5,382,470 A | 1/1995 | Vicik |
| 5,382,631 A | 1/1995 | Stehling et al. |
| 5,397,613 A | 3/1995 | Georgelos |
| 5,460,861 A | 10/1995 | Vicik et al. |
| 5,593,747 A | 1/1997 | Georgelos |
| 5,691,043 A * | 11/1997 | Keller et al. ................. 428/212 |
| 5,747,192 A | 5/1998 | Hughen et al. |
| 5,759,648 A | 6/1998 | Idlas |
| 5,834,077 A | 11/1998 | Babrowicz |
| 5,888,640 A * | 3/1999 | Marotta et al. ............ 428/308.4 |
| 5,928,740 A | 7/1999 | Wilhoit et al. |
| 6,004,599 A | 12/1999 | Bert et al. |
| 6,113,996 A * | 9/2000 | Amon et al. ................. 428/34.9 |
| 6,143,829 A | 11/2000 | Babb et al. |
| 6,171,627 B1 | 1/2001 | Bert et al. |
| 6,218,024 B1 | 4/2001 | Tamber et al. |
| 6,241,579 B1 | 6/2001 | Miller, III et al. |
| 6,303,233 B1 * | 10/2001 | Amon et al. ................. 428/516 |
| 6,306,969 B1 | 10/2001 | Patel et al. |
| 6,316,067 B1 | 11/2001 | Edwards et al. |
| 6,322,883 B1 * | 11/2001 | Williams ................. 428/308.4 |
| 6,329,054 B1 | 12/2001 | Rogestedt et al. |
| 6,340,532 B1 | 1/2002 | Huang et al. |
| 6,342,282 B1 | 1/2002 | Yoshii et al. |
| 6,344,250 B1 | 2/2002 | Arthurs |
| 6,359,073 B1 | 3/2002 | Babb et al. |
| 6,407,171 B1 | 6/2002 | Agarwal et al. |
| 6,423,420 B1 | 7/2002 | Brant et al. |
| 6,436,496 B1 | 8/2002 | Rackovan et al. |
| 6,534,189 B1 * | 3/2003 | Burns et al. ................. 428/447 |

FOREIGN PATENT DOCUMENTS

WO    WO 00/32393    8/2000

* cited by examiner

*Primary Examiner*—D. Lawrence Tarazano
(74) *Attorney, Agent, or Firm*—Rick F. James

(57) ABSTRACT

The present invention relates to oriented or hot-blown shrink films which may be manufactured from by a number of processes. The oriented films may be manufactured by double bubble, LISIM, tape bubble, trapped bubble or tenter framing processes. The films of the present invention are useful as a shrink film to package and label a variety of products. The films exhibit a high degree of MD shrinkage in a very controlled and consistent manner while providing a number of other positive characteristics such as optical clarity, puncture and abrasion resistance, controlled gauge, and superior web winding and handling characteristics. The shrink control layers of the films of the present invention contain a modifier component selected from plastomers and/or metallocene catalyzed ethylene-propylene copolymers and blends thereof.

60 Claims, No Drawings

HEAT-SHRINKABLE POLYMERIC FILMS

FIELD OF THE INVENTION

The present invention relates to single and multilayer uniaxially oriented, biaxially oriented, and blown heat-shrinkable films suitable for use in the packaging and labeling of articles of commerce. The present invention also relates to packages made from such heat shrinkable films, as well as packaged products utilizing such films.

BACKGROUND OF THE INVENTION

The distinguishing characteristic of a heat shrinkable film is the ability upon exposure to some level of heat to shrink or, if restrained, to create shrink tension within the film. These responses are initiated when the film is passed through a hot air or steam shrink tunnel. The resulting shrinkage of the film results in an aesthetically pleasing transparent wrapping which conforms to the contour of a product while providing the usual functions required of packaging materials such as protection of the product from loss of components, theft, or damage due to handling and shipment. Among the many items wrapped in polyolefin shrink films are cans, bottles, plastic containers, toys, games, sporting goods, stationery, greeting cards, hardware and household products, office supplies and forms, foods, phonograph records, and industrial parts.

Heat shrinkable films are required to possess a variety of controllable attributes. For example, in additional to a high shrink response, shrink films must also possess good optical and mechanical properties.

There are two main categories of heat shrink films, hot-blown shrink film and oriented shrink film. Hot-blown shrink film is usually made by a hot-blown bubble film process; conversely, oriented shrink film is made by biaxial and uniaxial orientation processes including double bubble, simultaneous longitudinal and transverse orientation which is sometimes referred to as LISIM® technology, tape bubble, trapped bubble or tenter framing. The use of linear motors to directly propel tenter clip to effect simultaneous longitudinal and transverse orientation is disclosed in U.S. Pat. No. 4,853,602. Both amorphous and semi-crystalline polymers can be made into oriented shrink films using elaborate biaxial orientation processes. For amorphous polymers, the orientation is performed at a temperature immediately above the glass transition temperature of the polymer. For semi-crystalline polymers, the orientation is performed at a temperature below the peak melting point of the polymer. General uniaxial orientation techniques are disclosed in U.S. Pat. No. 6,436,496. Uniaxially oriented films for use as dry cell battery labels are disclosed in U.S. Pat. No. 5,747,192.

Blown and oriented films are an important class of industrial products useful in the wrapping or packaging of various articles of commerce. Oriented isotactic polypropylene film is known to be useful for its high barrier properties, clarity and stiffness. Polypropylene polymers used for oriented films are typically isotactic homopolymers, or blends of isotactic polypropylene polymers with differing melt flow rates (MFR) or tacticity indices, or blends of isotactic polypropylene with atatic polypropylene, syndiotactic polypropylene, random polypropylene copolymers having minor amounts of ethylene or higher alpha-olefins, and ethylene copolymers. See, for example, U.S. Pat. Nos. 4,950,720 and 5,691,043. As disclosed in U.S. Pat. No. 4,921,749, other components such as petroleum resins may be added to modify properties such as heat-sealing performance, gas permeability and stiffness. Such oriented polypropylene, including biaxially oriented polypropylene (BOPP) films, have many desirable properties for use in the packaging and labeling of products. U.S. Pat. No. 6,436,496 discloses heat shrinkable films which may have a core layer with up to 55 wt. % of a polyolefin material with the balance being an ethylene-propylene copolymer.

The packaging and labeling of a wide variety of products in films, both transparent films as well as non-transparent films has for some time included packaging articles in heat shrinkable film. Heat shrinkable film can be used to obtain a tight package by placing an item into a bag or sleeve fabricated from a heat shrink film, then closing or sealing the bag by heat sealing, solvent sealing, or sealing with a hot melt adhesive, and thereafter exposing the bag to sufficient heat to cause shrinking of the bag and intimate contact between the bag and item. The heat that induces shrinkage can be provided by conventional heat sources, such as heated air, infrared radiation, hot water, hot oil combustion flames, or the like. Heat shrink wrapping of food items helps preserve freshness, is attractive, hygienic, and allows closer inspection of the quality of the packaged food item. Heat shrink wrapping of industrial and retail goods, which is alternatively referred to as industrial and retail bundling, preserves product cleanliness and also is a convenient means of bundling and segregating for transporting purposes. Similarly, heat shrinkable film may be used for labeling by wrapping the film around the article to be labeled and applying heat. The film will shrink causing the label to conform to the article thereby creating a tight-fitting and attractive label for the article.

In such packaging operations, it is frequently desirable to maintain the air or water within the shrink tunnel or water bath, at the lowest effective temperature to accomplish the desired level of film shrinkage, in order to avoid subjecting the packaged or labeled product to a temperature so high that there is an undesirable effect on the product. Such is particularly the case in the packaging of food products, such as fresh meat products which can be scorched by higher temperatures, even upon exposure to the relatively high temperature for only a brief period of time, for example, 30 seconds. Likewise, in the packaging of cheese products, low shrink temperatures are desirable in order to prevent discoloration of the cheese within the package. From an energy efficiency standpoint, it is also desirable to shrink the films at lower temperatures.

Furthermore, in the packaging of relatively rigid products which are not distorted by forces produced by a shrinking film, it is generally desirable to provide a heat shrinkable packaging film with as high a shrink response as possible, in order to provide the "tightest" possible packaging over the product. In general, a tighter package or label provides an appearance more pleasing to the purchaser of the article packaged or labeled. This is especially true with respect to packaging of highly contoured rigid products such as industrial mechanical components and bone-in meat products.

The shrink response of shrink film is obtained by initially stretching fabricated film to an extent several times its original dimensions to orient the film. This stretching may occur in a single direction or in multiple directions, depending on the process employed. For example, in hot-blown process, the film is stretched in all directions, in biaxially oriented films, the stretching occurs in both the machine and transverse directions and in the machine direction only for uniaxially oriented films. The stretching is usually accomplished while the fabricated film is sufficiently soft or molten, although cold drawn shrink films are also known in the art. After the fabricated film is stretched and while it is still in a stretched condition, the stretching or orientation is set by quickly cooling the film. Subsequent application of heat causes the oriented film to relax and, depending on the actual shrink temperature, the oriented film can return substantially back to its original unstretched dimensions, i.e., to shrink relative to its stretched dimension. In the prior art, most roll-fed MD (machine direction) heat shrinkable polyolefin films exhibit shrinkage of about 25% at 135° C. Typically, these films exhibit haze values of greater than 5% with gloss of less than 90%. Haze values referred to in this application are determined in accordance with ASTM D1003 testing method and gloss values are determined in accordance with ASTM D2457. The films often have poor storage stability exhibiting considerable shrinkage when stored at temperatures of 60° C. or higher for 14 days or more. For example, as exemplified in U.S. Pat. No. 5,747,192, conventional films typically retain less than 95% of their shrinkage after high temperature storage. Conventional films may also have poor seam integrity when used in conjunction with hot melt adhesives in label applications.

In order to provide a film with a higher shrinkage, it is generally necessary to orient the film to a higher degree. Conventional polyolefin based films having MD shrinkage greater than 25% at 135° C. generally exhibit problems in maintaining high optical quality upon undergoing shrinkage, especially substantial shrinkage. That is, such high shrink films undergo substantial "whitening" upon shrinkage, as well as a substantial reduction in gloss. Also, when high uniaxial shrink film is produced, typically a high MD stretch ratio must to be used in combination with lower MD stretch temperatures. This results in TD (transverse direction) stretch lanes or bands across the web. These stretch bands cause bagginess in the film, which limits the use of the film for further converting. Delamination of the film is also a potential problem during the shrinkage of such high shrink films. It is desirable to provide a film that maintains the highest level of transparency and gloss obtainable. The loss of optical properties of the prior art high shrink films is detrimental in many packaging and labeling applications.

Certain applications, e.g., labeling, covering, or packaging of materials such as boxes, plates, vessels, bottles, tubes, cylindrical material, e.g., pipes and rods, etc. are particularly suitable applications for heat shrinkable films. However, in certain situations it is desirable to affect shrinkage along a single axis without substantial shrinkage in the cross-direction. For example, in the process of labeling bottles by shrinking a tube of heat shrinkable material, if the film shrinks along its length, the label may not be positioned correctly but rather placed above the desired position upon shrinkage. Moreover, printing and other conversion processes of such label surfaces require heat stability in substantially one direction to meet machinability requirements. Uniaxially shrinkable materials can also be used in preparing tightly wrapped containers by lap heat sealing uniaxially shrinkable film resulting in shrinkage of the film.

In order to obtain uniaxially shrinkable materials it is possible to employ uniaxially oriented materials, i.e., materials which are oriented in only one direction. However, uniaxially oriented film can lack the requisite strength and toughness necessary for use in such applications. In as much as biaxially oriented films exhibit desirable strength and tear resistance in both directions of orientation, it is desirable to obtain a uniaxially heat shrinkable film which is biaxially oriented and thus substantially stable in the cross-direction.

For more detailed information on heat shrinkable films, reference may be found in U.S. Pat. Nos. 4,194,039; 3,808, 304; 4,188,350; 4,194,039; 4,377,616; 4,390,385; 4,448,792; 4,582,752; and 4,963,418. The manufacture of polypropylene heat shrinkable films using modifiers in a polypropylene based shrink layer to make films suitable for packaging, labeling, and other applications is disclosed in U.S. Pat. Nos. 5,691,043; 5,888,640; 6,303,233; and 6,322,883.

BRIEF DESCRIPTION OF THE INVENTION

The present invention relates to heat shrinkable made blown, uniaxially oriented, and biaxially oriented films suitable for use as a package material or label material for a variety of products such as food and other articles of commerce, including vehicular and consumer battery labels. The film of the present invention is particularly useful as a shrink-wrap for highly contoured containers and articles. The films of the present invention are characterized by high, predictable, and controlled shrinkage characteristics, with good optical clarity, gauge control, puncture resistance, and abrasion resistance, while having superior web winding and handling characteristics. The films of the present invention may be printed or made suitable for printing in accordance with any of the variety of techniques known in the art.

In various embodiments of this invention, the shrink control layers of the films are comprised of a primary polymeric component blended with a modifier polymeric material selected from an ethylene based plastomer material, a propylene based plastomer material, an ethylene/propylene copolymer material, and blends thereof. The shrink control layer may be combined with one or more additional layers of polymeric materials and/or coatings. The thickness of the shrink control layer ranges from about 9.25 $\mu$m to about 92.5 $\mu$m. The overall thickness of the film will vary depending upon the number of additional non-shrink control layers, if any, but may range from about 10.0 $\mu$m to about 100.0 $\mu$m. The non-shrink layers of the films may encompass a variety of materials, depending on the particular application intended for the films and the desirable properties of the films. The films are also useful as PVC, OPS, PET, PETG replacement materials for shrink sleeve applications in packaging and labeling.

Another embodiment of the present invention relates a package in which an article of commerce is packaged in a shrink film wrap film comprised of one or more of the films of the present invention described in the other embodiments.

Other embodiments of the present invention relate to labels comprised of one or more of the films of the present invention described in the other embodiments. Additional embodiments include packages or articles of commerce incorporating such labels.

DETAILED DESCRIPTION OF THE INVENTION

The films in accordance with the present invention may be oriented or hot-blown shrink films made from any of a number of processes. The oriented films may be manufactured in a variety of processes including machine direction orientation (MDO), double bubble, LISIM®, tape bubble, trapped bubble or tenter framing. The hot-blown films are typically manufactured in a simple bubble process.

The films of the present invention are useful as a shrink film to package and label a variety of products. The films exhibit a high degree of shrinkage in a very controlled and consistent manner while providing a number of other positive characteristics such as optical clarity, puncture and abrasion resistance, controlled gauge, and superior web winding and handling characteristics, such as, in biaxially oriented films, no TD (transverse direction) band or baggy lane formation at high MD stretch ratios and storage stability at temperatures up to 100° C. The films of the present invention may be processed using MD stretch ratios from 4.5–9 and still have a uniformly good appearance without stretch bands or baggy lanes. The films of the present invention have haze values of less than 5%, while achieving gloss values greater than 90%. The films of the present invention also possess enhanced storage stability characteristics with minimum or no shrinkage at temperatures of 60° C. or higher. In one embodiment, when stored at 60° C. for 14 days, the films of the present invention retain 95% of their shrinkage. The films also have better label seam integrity when used with hot melt adhesives in both labeling and packaging applications.

These positive characteristics are made possible by unique shrink control layers. The term shrink control layer refers to the film layer that provides or controls the shrink response of the film. In a single layer film, the shrink control layer will be the film itself. In multilayer films, the shrink control layer is usually the core or another inside layer of the film, typically, the thickest film layer. However, multilayer films, the shrink response of the films may be controlled by more than one layer and therefore have more than one shrink control layer. The shrink control layers are comprised of a unique blend of polymeric components.

The films produced in accordance with the present invention, exhibit shrink levels of about 10% to about 65% at 135° C. in the machine direction for biaxially oriented films. In one embodiment, the films of the present invention exhibit machine direction shrinkage of about 24% to about 35% at 135° C. In another embodiment, the films exhibit machine direction shrinkage of from about 30% to about 50% at 135° C. The biaxially oriented films in accordance with the present invention exhibit transverse direction shrinkages of less than about 5% at 135° C. In another embodiment, the films of the present invention have a transverse heat shrink of less than about 2% at 135° C.

The shrink control layers of the films of the present invention are comprised of a primary polymeric component and a modifier component. The primary polymeric component is comprised of at least one polypropylene homopolymer or propylene copolymer or blends thereof that may be used in isolation as the primary polymeric component or combined with other polymeric materials or additive components to form the primary polymeric component. The primary polymeric component may comprise from about 60 wt. % to about 90 wt. % of the shrink control layer. In one embodiment of the invention, the shrink control layer comprises from about 70 wt. % to about 90 wt. % of the primary polymeric component. In another embodiment, the shrink control layer comprises about 80 wt. % to about 90 wt. % of the primary polymeric component.

A polypropylene homopolymer selected for use as the primary polymeric component may be an isotactic polypropylene polymer, a syndiotactic polypropylene, or a blend of isotactic and syndiotactic polypropylene homopolymers. Suitable isotactic polypropylenes are ExxonMobil 4612 and 4352, AtoFina 3371, and Borealis HC113BF. High crystalline polypropylene homopolymer resins may also be used. Exemplary high crystalline polypropylene homopolymers include Borealis HC110BF and Basell HA722J ADSTIF resins. A suitable syndiotactic polypropylene is FinaPlas 1471 manufactured and sold by AtoFina.

Suitable polypropylene copolymers for use in the primary polymeric component are propylene/ethylene copolymers with an ethylene content of about 0.5% to about 1.5%. Exemplary polypropylene copolymers for use in the primary polymeric component of the shrink control layer are ExxonMobil 4712, AtoFina EOD 9809, and AtoFina EOD 0130. Propylene-butylene copolymers may be used.

The primary polymeric component of the shrink control layer may be a blend of homopolymer polypropylenes, a blend of propylene copolymers, or a blend of propylene homopolymers and propylene copolymers. The blend may comprise about 60 wt. % to about 90 wt. % of the shrink control layer. In one embodiment of the present invention, the shrink control layer comprises about 70 wt. % to about 90 wt. % of the primary polymeric component made from an isotactic and syndiotactic polypropylene homopolymer blend. In another embodiment, the shrink control layer comprises about 80 wt. % to about 90 wt. % of a primary polymeric component made from an isotactic and syndiotactic polypropylene homopolymer blend. In the embodiments in which the primary polymeric component is comprised of a blend of isotactic and syndiotactic polypropylene, the percentage of the isotactic polypropylene component in the blend ranges from about 70 wt. % to about 90 wt. % of the blend and the syndiotactic polypropylene component in the blend ranges from about 10 wt. % to about 30 wt. % of the blend.

In addition to the propylene component, the shrink control layers of the films of the present invention are also comprised of a modifier component selected from plastomers, metallocene catalyzed ethylene-propylene copolymers and blends thereof. In one embodiment, the modifier component comprises about 10 wt. % to about 40 wt. % of the shrink control layer. In another embodiment, the shrink control layer is comprised of about 10 wt. % to about 30 wt. % of the modifier component. In still another embodiment, the shrink control layer is comprised of about 10 wt. % to about 20 wt. % of the modifier component.

The plastomers for use as the modifier component may be either ethylene or propylene based plastomers. In general, ethylene plastomers are film-forming plastomers that are, typically but not exclusively, produced via well known single-site (including metallocene) catalyst technology, which permits very precise control of (i) the comonomer incorporated into an ethylene polymer and (ii) the molecular weight distribution. Ethylene plastomers may be copolymers of ethylene or propylene with higher α-olefins having from 3 to about 10 carbon atoms, such as, for example, 1-butene, 1-hexene and 1-octene. Generally, the higher alpha-olefin content will range from about 5 wt. % to about 30 wt. %.

Suitable ethylene plastomers for use in the modifier component have a density range of about 0.865 to 0.889 g/cm3 and a peak melting point range of about 49° C. to about 85° C. Ethylene plastomers are commercially available from ExxonMobil Chemical Company, under the trademark EXACT. Ethylene plastomers are also commercially available from Dow Plastics, Dow U.S.A., Midland, Mich., under the trademark ENGAGE, e.g., ENGAGE EG8100 (an ethylene/1-octene copolymer), or AFFINITY.

Suitable propylene based plastomers are comprised of copolymers of propylene with higher alpha olefins. The plastomers has a controlled crystallinity with unique properties derived from a combination of metallocene catalysis and solution polymerization reactor technology. Blends of these propylene plastomers and polypropylene homopolymers are miscible at process temperatures (e.g. 220° C.) and rheological properties are comparable to a single polyolefin component. The components retain their thermal properties such as the glass transition temperature (Tg) of the propylene plastomer and melting temperature (Tm) of the polypropylene.

In one embodiment, suitable metallocene catalyzed ethylene/propylene copolymers for use as the modifier component have an ethylene content of from about 2 wt. % to about 6 wt. % with melting points from about 115° C. to about 150° C. Copolymers of this type are commercially available from AtoFina. These copolymer resins provide excellent thermal shrinkage and optics for the films of the present invention. In another embodiment, the ethylene content is about 5 wt. %.

The shrink control layers of the present invention may be combined with one or more additional layers to form multilayer films. The films of the present invention may be comprised of three and five layer structures although any number of layers is possible, including even numbers of film layers or a single layer film. Suitable skin layers for the films are comprised of one of the following or a blend of two or more of the following: propylene homopolymers, high density polyethylene (HDPE) (density ~0.96 g/cc or higher), low density polyethylene (LDPE), linear low density polyethylene (LLDPE) (density less than 0.935 g/cc), medium density polyethylene (MDPE) (density between 0.935 and 0.96 g/cm3), propylene-ethylene random copolymers (both Ziegler Natta and metallocene catalyzed), propylene-ethylene-butylene terpolymers, and propylene-butylene copolymers. The skin layers may incorporate antiblock agents such as SYLOBLOC, TOSPEARL, KAOPOLITE, and SIPERNAT at concentrations ranging from about 500 ppm to about 10,000 ppm.

The use of a metallocene random copolymer in the core and the skin typically produces high gloss (>95%) film. If a matte surface is desired instead of a glossy surface, the skin is usually a blend of two or more incompatible polymers that create a matrix such that the surface roughness characteristics and light reflectance and scattering are non-homogeneous and non-uniform. For example, a blend of 40% terpolymer with 40% copolymer and 20% HDPE typically produces a matte surface. When produced on a LISIM line or a blown film line, other polymers that have lower densities and melting points may also be used as skin layer materials e.g., ionomers, plastomers, EVA and EAA copolymers. In a typical three layer structure, the film may have skin layers comprising ethylene-propylene-butylene terpolymers, when a lap seal is desired. The terpolymers can be formulated with antiblock agents like SYLOBLOC, TOSPEARL, KAOPOLITE or SIPERNAT to prevent blocking and with slip additives like silicone oil and/or fatty acid amides to improve machinability. In glue-applied applications, a high density polyethylene skin can be used on one side for improved printability and a polypropylene homopolymer formulated with antiblock can be used on the other side for machinability. These skins can be interchanged from print side to machine side depending on the specific application for which the film is being produced. Also, materials such as low density polyethylene, linear low density polyethylene, medium density polyethylene, propylene-ethylene copolymers with an ethylene content from about 2.5 wt. % to about 15.0 wt. %, and propylene-butylene copolymers may be used as skin resins to provide various functionalities. A cavitating agent such as calcium carbonate or polybutylene terephthalate may be incorporated into the core to produce a cavitated white film in either a three layer or a five layer structure. Typically, the calcium carbonate will be incorporated at a concentration of about 20.0 wt. % to about 45.0 wt. % of the core layer and polybutylene terephthalate at a concentration of about 6.0 wt. % to about 15.0 wt. % of the core layer. When multilayer structures are produced, the films in accordance with the present invention may incorporate from about 2.0 wt. % to about 15.0 wt. % of titanium dioxide in the intermediate layers to provide additional whiteness. The intermediate layers may also contain from about 45 wt. % to about 90 wt. % of the primary polymeric component as described above and from about 10 wt. % to about 40 wt. % of the modifier component as described above. Also, a high melt flow rate (e.g. 5–8 g/10 min) polypropylene may be blended with a low melt flow polypropylene (3 MFR) in the intermediate layer to help coextrusion uniformity and avoid melt instability at the interfaces. Additionally, the films in accordance with the present invention may incorporate a variety of coatings. The film structures produced in this invention may be coated or metallized to provide additional barrier properties. Coatings without crosslinking would be preferred such as PVdC.

The films produced in accordance with the present invention, exhibit high shrinkage with better control of the shrinkage as well as improved hot melt adhesive performance. When films of the present invention were applied to a contoured container using hot melt adhesives, it was observed that the seam integrity was better under normal shrink process conditions than was previously possible. Additionally, the films exhibit improved profile thickness control accompanied by enhanced web winding and handling characteristics. In spite of being oriented at a high MD ratio, the films did not exhibit TD bands, baggy lanes nor did they show a tendency to "snap-back" at the tenter exit, due to any shrink or stress relaxation. The films in accordance with the present invention also exhibit improved optical properties, toughness, and impact resistance.

The percentage of shrink may be measured according to ExxonMobil Chemical Test Procedure #438 or according to ASTM D1204. The two tests follow the same principles but differ in some specific protocols. The data reported in this application were measured according to ExxonMobil Chemical Procedure #438. According to Procedure #438, the measurement test involves placing a 2.54 cm by 17.78 cm film sample in a convection oven controlled to a target temperature (typically 135° C.) for 7 minutes and reporting the change from the original dimension as a percentage value. For MD shrink %, the sample is long (17.78 cm) in the MD direction and short (2.54 cm) in the TD direction and vice versa for TD shrink %. Thus, MD shrink percentage=[(initial MD dimension−final MD dimension)/(initial MD dimension)]×100. For low to non-shrink polypropylene films, percent dimensional stability is reported instead of shrink percentage. MD percent dimensional stability=[(final MD dimension−initial MD dimension)/(initial MD dimension)]×100.

The thickness profile across the web, also known as the gauge profile, was measured and controlled using a Honeywell Measurex sensor, scanner and detector device. The basic measurement principle involves exposing the moving film web to radiation and then measuring the transmitted intensity and degree of attenuation of the radiation due to the film. The transmitted intensity can then be mathematically correlated to the thickness of the web. The scanner and detector move across the web in a transverse direction and the average thickness of the film is recorded along with the standard deviation. Typically, a number referred to as the scan %, defined as the ratio of twice the standard deviation ($2\sigma$) to the average film thickness, is reported as a measure of the uniformity of the thickness profile. The scan % number is also referred to as the 2σ value reported as a % of the average thickness. Exemplary scan % numbers are less than 5%. If the average thickness of the film is 20 microns and the standard deviation is 0.25 microns, the scan % would be [(2*0.25)/20]*100=2.5%.

The above-described properties and other advantages of the films of the present invention are demonstrated by the following Examples of films produced using the simultaneous biaxial orientation process.

EXAMPLE 1

In this comparative example film, a multilayer film was produced by simultaneously biaxially orienting a core blend of 90 wt. % isotactic polypropylene and 10 wt. % syndiotactic polypropylene 8× in the machine direction (MD) and 7× in the transverse direction (TD). A polypropylene skin formulated with 3000 ppm KAOPOLITE 1152 and 2400 ppm SIPERNAT antiblock agents was used on one side and a terpolymer skin on the other side. The film exhibited the following characteristics.

| | |
|---|---|
| Average Offline MD % shrinkage at 135° C.: | 35.6 |
| Average MD % shrinkage at 135° C. after 1 month storage at room temperature: | 32 |
| Average MD % shrinkage at 135° C. after 4 months room temperature storage: | 32 |
| Average Offline TD % shrinkage at 135° C.: | −1.5 |
| Average TD % shrinkage determined at 135° C. after 1 month storage at room temperature: | −1.0 |
| Average TD % shrinkage determined at 135° C. after 4 months storage at room temperature: | 1.5 |
| Average Haze: | 2% |
| Gauge Variation 2σ, %: | <4 |
| Winding/appearance: | some TD bands |

EXAMPLE 2

A multilayer film was produced by simultaneously biaxially orienting a core blend of 80 wt. % isotactic polypropylene, 10 wt. % syndiotactic polypropylene, and 10 wt. % Exact 8203® ethylene plastomer 8× in the MD and 7× in the TD. A polypropylene skin formulated with 3000 ppm KAOPOLITE 1152 and 2400 ppm SIPERNAT antiblock agents was used on one side and a terpolymer skin on the other side. The film exhibited the following characteristics.

| | |
|---|---|
| Average Offline MD % shrinkage at 135° C.: | 38.5 |
| Average MD % shrinkage at 135° C. after 1 month storage at room temperature: | 37 |
| Average MD % shrinkage at 135° C. after 4 months storage at room temperature: | 34 |
| Average Offline TD % shrinkage at 135° C.: | −0.3 |
| Average TD % shrinkage determined at 135° C. after 1 month storage at room temperature: | 0 |
| Average TD % shrinkage determined at 135° C. after 4 months storage at room temperature: | 1.0 |
| Average Haze: | 2.1% |
| Gauge Variation 2σ, %: | <2.75 |
| Winding/appearance: | TD bands Lighter |

EXAMPLE 3

A multilayer film was produced by simultaneously biaxially orienting a core blend of 70 wt. % isotactic polypropylene, 10 wt. % syndiotactic polypropylene, and 20 wt. % Exact 8203® ethylene plastomer 8× in the MD and 7× in the TD. A polypropylene skin formulated with 3000 ppm KAOPOLITE 1152 and 2400 ppm SIPERNAT antiblock agents was used on one side and a terpolymer skin on the other side. The film exhibited the following characteristics.

| | |
|---|---|
| Average Offline MD % shrinkage at 135° C.: | 39.2 |
| Average MD % shrinkage at 135° C. after 1 month storage at room temperature: | 38 |
| Average MD % shrinkage at 135° C. after 4 months storage at room temperature: | 37.5% |
| Average Offline TD % shrinkage: | 2.0 |
| Average TD% shrinkage determined at 135° C. after 1 month storage at room temperature: | 2.0 |
| Average TD % shrinkage determined at 135° C. after 4 months storage at room temperature: | 3.0 |
| Average Haze: | 2.3 |
| Gauge Variation 2σ, %: | <2.25 |
| Winding/appearance: | No TD bands present |

These films were stable when stored at elevated ambient conditions as indicated by exhibiting less than 5% shrink below 80° C.

Perfomance data for film structures in accordance with the present invention produced in sequential biaxial orientation processes are shown in the following examples.

EXAMPLE 4

A multilayer film was produced by sequentially biaxially orienting a core blend of 71 wt. % isotactic polypropylene, 4 wt. % syndiotactic polypropylene, and 25 wt. % metallocene random copolymer having a melting point of 115° C. from Atofina. The orientation was 1.8× in the first MD section followed by 8× in the TD followed by 3.8× in the second MD section. Thus, the total MD stretch ratio was about 6.84. A high density polyethylene skin was used on one side and a terpolymer skin on the other side. The film exhibited the following shrink characteristics.

TABLE I

| ° C. | ° F. | MD % Shrinkage | TD % Shrinkage |
|---|---|---|---|
| 50 | 122 | — | — |
| 60 | 140 | 0.78 | — |
| 70 | 158 | 1.95 | — |
| 80 | 176 | 3.52 | −0.78 |
| 90 | 194 | 6.25 | −1.17 |
| 100 | 212 | 11.33 | −1.56 |
| 110 | 230 | 21.88 | −3.13 |
| 120 | 248 | 32.81 | −3.91 |
| 130 | 266 | 36.72 | −3.13 |
| 140 | 284 | 40.23 | 4.69 |

EXAMPLE 5

A multilayer film was produced by sequentially biaxially orienting a core blend of 56 wt. % isotactic polypropylene, 4 wt. % syndiotactic polypropylene, and 40 wt. % metallocene random copolymer having a melting point of 115° C. from Atofina. The orientation was 1.7 in the first MD section followed by 8× in the TD followed by 3.8× in the second MD section. Thus, the total MD stretch ratio was about 6.46. A high density polyethylene skin was used on one side and a terpolymer skin on the other side. The film exhibited the following shrink characteristics.

TABLE II

| ° C. | ° F. | MD % Shrinkage | TD % Shrinkage |
|---|---|---|---|
| 50 | 122 | — | — |
| 60 | 140 | 0.78 | — |
| 70 | 158 | 1.95 | — |
| 80 | 176 | 5.08 | −1.17 |
| 90 | 194 | 7.42 | −1.17 |
| 100 | 212 | 12.11 | −4.69 |
| 110 | 230 | 19.14 | −5.08 |
| 120 | 248 | 31.25 | −4.69 |
| 130 | 266 | 39.06 | −3.13 |
| 140 | 284 | 40.63 | 3.13 |

EXAMPLES 6–9

In these Examples, 25 micron thick 3 layer films were prepared by simultaneous biaxial orientation. In order to obtain maximum MD shrinkage and minimum TD shrinkage on a simultaneous stretch line like a LISIM line, the stretching profile for these examples was based on the following procedure. The MD stretch should be performed in two stages. The first MD stretch (1–3 times) should start when the TD stretch (5–8 times) begins and should be completed in as short an oven length as possible. The TD stretch should be completed in as short an oven length as possible. TD relaxation should be from about 15% to about 28% in one embodiment and from about 23% to about 26% in another embodiment. The second MD stretch should be maximized (3–9 times) over the greatest possible post-TD stretch oven length. In addition, oven temperatures should be as low as possible during the second MD stretch (after the TD is completed) but higher during the TD stretch. The films had 1 μm thick skin layers, on each side of the core, comprised of an ethylene-propylene-butylene terpolymer available form BP Solvay under the designation KS333. The core layer composition and shrink characteristics for each film were as follows:

TABLE III

| Ex. No. | Core Layer Composition | MD Shrink @ 135° C. | TD Shrink @ 135° C. | MD Shrink @ 120° C. | TD Shrink @ 120° C. |
|---|---|---|---|---|---|
| 6 | 68% i-PP + 12% s-PP + 20% m-RCP | 40% | 0.5% | 20% | −5% |
| 7 | 68% i-PP + 12% s-PP + 20% C2 plastomer | 40% | 0% | 32% | −4% |
| 8 | 68% i-PP + 12% s-PP + 30% C2 plastomer | 42% | 0% | 32% | −5% |
| 9 | 70% i-PP + 30% m-RCP | 45% | −1% | 32.5% | −5% | i-PP = isotactic polypropylene available from Borealis under the designation HC113BF or Fina under the designation EOD 9809
s-PP = syndiotactic polypropylene available from Fina under the designation FINA PLAS 1471
C2 plastomer = metallocene catalyzed ethylene plastomer available from ExxonMobil under the designation EXACT 8203
m-RCP = metallocene ethylene/propylene random copolymer available from Fina under the designation EOD 0105

The films of Examples 6–9 exhibited haze values of less than 2% and gloss values greater than 95%.

Comparing the films of Examples 2–9 to the control film of Example 1, it is seen that the performance characteristics of the films are enhanced by the inclusion of modifier material in the shrink control layer. Specifically, it is demonstrated that use of the modifiers results in a film having a higher MD shrinkage with improved TD shrinkage characteristics. Additionally, the films containing the plastomers have improved gauge control. Moreover, it is seen that this improvement in film properties is enhanced by inclusion of modifier materials in an amount up to about 40 wt. %. Also, the addition of up to about 40% modifier did not adversely impact the optics of the film. In addition, with the inclusion of the modifiers, the storage temperature stability of the films improved. The Examples demonstrate with the inclusion of the modifiers, the loss in shrinkage after 4 months generally decreases and is below 5% lost shrinkage. Moreover, in the exemplified embodiments of the present invention, the films exhibit higher machine direction absolute shrink values that are well above 35%, in comparison to the control film of Example 1. When a 3-stage sequential process is used to produce the high MD shrink film, the storage temperature stability is even better. In one embodiment, the 3-stage sequential process is orientation in the machine direction from about 1.5% to about 3.0% followed by orientation in the transverse direction for about 6.0% to about 9.0%, and then orientation in the machine direction from about 2.0% to about 5.0%. For examples 4 and 5, the loss in shrinkage after 4 months is less than 2%. The data indicates that, with one embodiment of the present invention, it is possible to get a TD shrinkage of less than 5% at 135° C. with a film having good optical properties and seam integrity. This value can be controlled to 0±1% by refining the process conditions like degree of relaxation in the TD directions and TD stretch and annealing temperature. It should also be noted that the MD and TD shrinkage values of the films of the present invention may be fine tuned by adjusting process conditions.

All patents and publications referred to herein are hereby incorporated by reference in their entireties.

This application includes references to certain trademarks. Although the use of trademarks is permissible in patent applications, the proprietary nature of the marks should be respected and every effort made to prevent their use in any manner which might adversely affect their validity as trademarks.

Although the present invention and its advantages have been described in detail, it should be understood that various changes, substitutions, and alterations could be made herein without departing from the spirit and scope of the invention as defined by the appended claims.

What is claimed is:

1. A biaxially oriented heat shrinkable polymeric film comprising a shrink control layer comprised of a blend of about 60 wt. % to about 90 wt. % of a primary polymeric component and about 10 wt. % to about 40 wt. % of a modifier component wherein the modifier component is selected from the group consisting of an ethylene plastomer, a propylene plastomer, a metallocene catalyzed ethylene/propylene copolymer, and blends thereof, and wherein the film has a machine direction shrinkage of about 30% to about 50% at 135° C. and a transverse direction shrinkage less than about 5% at 135° C.

2. The film of claim 1 wherein the primary polymeric component is selected from the group consisting of polypropylene homopolymers, propylene copolymers, and blends thereof.

3. The film of claim 2 wherein the shrink control layer is comprised of about 10 wt. % to about 30 wt. % of the modifier component.

4. The film of claim 3 wherein the film is a multilayer film having a core layer.

5. The film of claim 4 wherein the core layer is voided and comprises a cavitating agent selected from the group consisting of about 6.0 wt. % to about 15 wt. % polybutylene terephthalate and about 20.0 wt. % to about 45.0 wt. % calcium carbonate.

6. The film of claim 4 wherein the shrink control layer is the core layer of the film.

7. The film of claim 4 comprised of at least two shrink control layers.

8. The film of claim 1 wherein the primary polymeric component is comprised of about 70 wt. % to about 90 wt. % of isotactic polypropylene and about 4 wt. % to about 30 wt. % syndiotactic polypropylene.

9. The film of claim 5 comprising a coextruded first skin layer comprised of a material selected from the group consisting of a propylene homopolymer, a high density polyethylene, a low density polyethylene, a linear low density polyethylene, a medium density polyethylene, a propylene-ethylene random copolymer, a propylene-ethylene-butylene terpolymer, a propylene-butylene copolymer, and blends thereof.

10. The film of claim 9 comprising a coextruded second skin layer comprised of a material selected from the group consisting of a propylene homopolymer, a high density polyethylene, a low density polyethylene, a linear low density polyethylene, a medium density polyethylene, a propylene-ethylene random copolymer, a propylene-ethylene-butylene terpolymer, a propylene-butylene copolymer, and blends thereof.

11. The film of claim 10 comprising at least five coextruded layers having at least one intermediate layer, between the core layer and each skin layer, comprising from about 2.0 wt. % to about 15.0 wt. % titanium dioxide.

12. The film of claim 11 wherein the intermediate layer between the core layer and each skin layer comprises from about 10 wt. % to about 40 wt. % of a component selected from the group consisting of an ethylene plastomer, a propylene plastomer, an ethylene/propylene copolymer, and blends thereof and from about 45 wt. % to about 90 wt % of a component selected from the group consisting of polypropylene homopolymers, propylene copolymers, and blends thereof.

13. The film of claim 12 wherein the film retains at least 95% of its machine direction shrinkage when stored at a temperature of 60° C. for 14 days.

14. The film of claim 3 wherein the film is a heat shrinkable film produced by a hot-blown process.

15. The film of claim 3 wherein the film is a uniaxially oriented heat shrinkable film.

16. The film of claim 3 wherein the film is a heat shrinkable film produced by a sequential biaxial orientation process.

17. A biaxially oriented heat shrinkable polymeric film produced by simultaneous biaxial orientation comprising a shrink control layer comprised of a blend of about 60 wt. % to about 90 wt. % a primary polymeric component and about 10 wt. % to about 40 wt. % of a modifier component selected from the group consisting of an ethylene plastomer, a propylene plastomer, a metallocene catalyzed ethylene/propylene copolymer, and mixtures thereof, and wherein the film has a machine direction shrinkage of about 30% to about 50% at 135° C. and a transverse direction shrinkage less than about 5% at 135° C.

18. The film of claim 17 wherein the blend is comprised of about 70 wt. % to about 90 wt. % isotactic polypropylene and about 4 wt. % to about 30 wt. % syndiotactic polypropylene.

19. The film of claim 17 wherein the shrink control layer is comprised of about 10 wt. % to about 30 wt. % of the modifier component.

20. The film of claim 19 wherein the film is a multilayer film having a core layer.

21. The film of claim 20 wherein the core layer is voided and comprises a cavitating agent selected from the group consisting of about 6.0 wt. % to about 15 wt. % polybutylene terephthalate and about 20.0 wt. % to about 45.0 wt. % calcium carbonate.

22. The film of claim 20 wherein the shrink control layer is the core layer of the film.

23. The film of claim 20 comprised of at least two shrink control layers.

24. The film of claim 22 wherein the primary polymeric component is selected from the group consisting of polypropylene homopolymer, propylene copolymers, and blends thereof.

25. A label comprised of a heat shrinkable polymeric film comprising a shrink control layer comprised of a blend of about 60 wt. % to about 90 wt. % of a primary polymeric component and about 10 wt. % to about 40 wt. % of a modifier component selected from the group consisting of an ethylene plastomer, a propylene plastomer, a metallocene catalyzed ethylene/propylene copolymer, and mixtures thereof, and wherein the film has a machine direction shrinkage of about 30% to about 50% at 135° C. and a transverse direction shrinkage less than about 5% at 135° C.

26. The label of claim 25 wherein the primary polymeric component is selected from the group consisting of polypropylene homopolymers, propylene copolymers, and blends thereof.

27. The label of claim 26 wherein the shrink control layer is comprised of about 10 wt. % to about 30 wt. % of the modifier component.

28. The label of claim 27 wherein the film is a heat shrinkable film produced by a hot-blown process.

29. The label of claim 27 wherein the film is a multilayer film having a core layer.

30. The label of claim 29 wherein the core layer is voided and comprises a cavitating agent selected from the group consisting of about 6.0 wt. % to about 15 wt. % polybutylene terephthalate and about 20.0 wt. % to about 45.0 wt. % calcium carbonate.

31. The label of claim 29 wherein the shrink control layer is the core layer of the film.

32. The label of claim 29 comprised of at least two shrink control layers.

33. The label of claim 25 wherein the primary polymeric component is comprised of about 70 wt. % to about 90 wt. % isotactic polypropylene and about 4 wt. % to about 30 wt. % syndiotactic polypropylene.

34. The label of claim 30 wherein a coextruded first skin layer is comprised of a material selected from the group consisting of a propylene homopolymer, a high density polyethylene, a low density polyethylene, a linear low density polyethylene, a medium density polyethylene, a propylene-ethylene random copolymer, a propylene-ethylene-butylene terpolymer, a propylene-butylene copolymer, and blends thereof.

35. The label of claim 34 comprising a coextruded second skin layer, comprising a material selected from the group consisting of a propylene homopolymer, a high density polyethylene, a low density polyethylene, a linear low density polyethylene, a medium density polyethylene, a propylene-ethylene random copolymer, a propylene-ethylene-butylene terpolymer, a propylene-butylene copolymer, and blends thereof.

36. The label of claim 35 comprising at least five coextruded layers having at least one intermediate layer, between the core layer and each skin layer, comprising from about 2.0 wt. % to about 15.0 wt. % titanium dioxide.

37. The label of claim 36 wherein the intermediate layer between the core layer and each skin layer comprises from about 10 wt. % to about 40 wt. % of a component selected from the group consisting of an ethylene plastomer, a propylene plastomer, an ethylene/propylene copolymer, and blends thereof and from about 45 wt. % to about 90 wt. % of a component selected from the group consisting of polypropylene homopolymers, propylene copolymers, and blends thereof.

38. The label of claim 37 wherein the film retains at least 95% of its machine direction shrinkage when stored at a temperature of 60° C. for 14 days.

39. The label of claim 31 wherein the film is produced by sequential biaxial orientation.

40. The label of claim 31 wherein the film is produced by simultaneous biaxial orientation.

41. A packaged product comprising an article of commerce wrapped in a biaxially oriented polymeric heat shrinkable film comprising a shrink control layer comprised of a blend of about 60 wt. % to about 90 wt. % of a primary polymeric component and about 10 wt. % to about 40 wt. % of a modifier component selected from the group consisting of an ethylene plastomer, a propylene plastomer, a metallocene catalyzed ethylene/propylene copolymer, and blends thereof, and wherein the film has a machine direction shrinkage of about 30% to about 50% at 135° C. and a transverse direction shrinkage or less than about 5% at 135° C.

42. The packaged product of claim 41 wherein the wherein the primary polymeric component is selected from the group consisting of polypropylene homopolymers, propylene copolymers, and blends thereof.

43. The packaged product of claim 41 wherein the film is produced by sequential biaxial orientation.

44. The packaged product of claim 41 wherein the film is produced by simultaneous biaxial orientation.

45. The packaged product of claim 41 wherein the film is a multilayer film having a core layer.

46. The packaged product of claim 45 wherein the core layer is voided and comprises a cavitating agent selected from the group consisting of about 6.0 wt. % to about 15 wt. % polybutylene terephthalate and about 20.0 wt. % to about 45.0 wt. % calcium carbonate.

47. The packaged product of claim 45 wherein the shrink control layer is the core layer of the film.

48. The packaged product of claim 47 wherein the film comprises a coextruded first skin layer comprised of a material selected from the group consisting of a propylene homopolymer, a high density polyethylene, a low density polyethylene, a linear low density polyethylene, a medium density polyethylene, a propylene-ethylene random copolymer, a propylene-ethylene-butylene terpolymer, a propylene-butylene polymer, and blends thereof.

49. The packaged product of claim 48 wherein the film comprises a coextruded second skin layer comprised of a material selected from the group consisting of a propylene homopolymer, a high density polyethylene, a low density polyethylene, a linear low density polyethylene, a medium density polyethylene, a propylene-ethylene random copolymer, a propylene-ethylene-butylene terpolymer, a propylene-butylene copolymer, and blends thereof.

50. The package product of claim 42 wherein the film is a heat shrinkable film produced by a hot-blown process.

51. The packaged product of claim 42 wherein the film is a uniaxially oriented heat shrinkable film.

52. A method for producing a heat shrinkable film comprised of:
  (a) extruding a polymeric layer comprised of a blend of about 60 wt. % to about 90 wt. % of a primary polymeric component and about 10 wt. % to about 40 wt. % of a modifier component wherein the modifier component is selected from the group consisting of an ethylene plastomer, a propylene plastomer, a metallocene catalyzed ethylene/propylene copolymer, and blends thereof, and wherein the film has a machine direction shrinkage of about 30% to about 50% at 135° C. and a transverse direction shrinkage of less than about 5% at 135° C.; and
  (b) biaxially orienting the polymeric layer to form a heat shrinkable film wherein the polymeric layer is a shrink control layer.

53. The method of claim 52 wherein the primary polymeric component is selected from the group consisting of polypropylene homopolymers, propylene copolymers, and blends thereof.

54. The method of claim 52 wherein additional film layers are coextruded with the polymeric layer to form a multilayer film having a core layer and wherein the polymeric layer is the core layer.

55. The method of claim 54 wherein the core layer is voided and comprises a cavitating agent selected from the group consisting of about 6.0 wt. % to about 15 wt. % polybutylene terephthalate and about 20.0 wt. % to about 45.0 wt. % calcium carbonate.

56. The method of claim 54 wherein the additional layers comprise a coextruded first skin layer comprised of a material selected from the group consisting of a propylene homopolymer, a high density polyethylene, a low density polyethylene, a linear low density polyethylene, a medium density polyethylene, a propylene-ethylene random copolymer, a propylene-ethylene-butylene terpolymer, a propylene-butylene copolymer, and blends thereof.

57. The method of claim 56 wherein the polymeric layer is biaxially oriented in a sequential orientation process.

58. The method of claim 56 wherein the polymeric layer is biaxially oriented in a simultaneous orientation process.

59. The method of claim 56 wherein the additional layers comprise a coextruded second skin layer comprised of a material selected from the group consisting of a propylene homopolymer, a high density polyethylene, a low density polyethylene, a linear low density polyethylene, a medium density polyethylene, a propylene-ethylene random copolymer, a propylene-ethylene-butylene terpolymer, a propylene-butylene copolymer, and blends thereof.

60. The method of claim 52 wherein the polymeric layer is oriented in a hot-blown process.

* * * * *